United States Patent [19]

Hougen

[11] 4,322,187
[45] Mar. 30, 1982

[54] ANNULAR HOLE CUTTER

[76] Inventor: Everett D. Hougen, G-5072 Corunna Rd., Flint, Mich. 48504

[21] Appl. No.: 160,500

[22] Filed: Jun. 18, 1980

[51] Int. Cl.³ .......................................... B23B 41/02
[52] U.S. Cl. .................................... 408/204; 408/703
[58] Field of Search ............... 408/191, 196, 197, 204, 408/206, 207, 209, 233, 214, 703, 713, 227

[56] References Cited

U.S. PATENT DOCUMENTS

| | | | |
|---|---|---|---|
| 2,869,405 | 1/1959 | Wolfe | 408/233 |
| 3,227,013 | 1/1966 | Zimmerman | 408/204 |
| 3,559,513 | 2/1971 | Hougen | 408/204 |
| 3,592,554 | 7/1971 | Takahara | 408/204 |
| 3,609,056 | 9/1971 | Hougen | 408/204 |
| 3,860,354 | 1/1975 | Hougen | 408/206 |

*Primary Examiner*—Harrison L. Hinson
*Attorney, Agent, or Firm*—Barnes, Kisselle, Raisch & Choate

[57] ABSTRACT

An annular cutter wherein the outer periphery of the cutter side wall is accurately concentric to the central rotary axis of the cutter and the inner periphery of the cutter side wall is eccentric to a predetermined amount with respect to the outer periphery of the side wall.

11 Claims, 3 Drawing Figures

U.S. Patent  Mar. 30, 1982  4,322,187
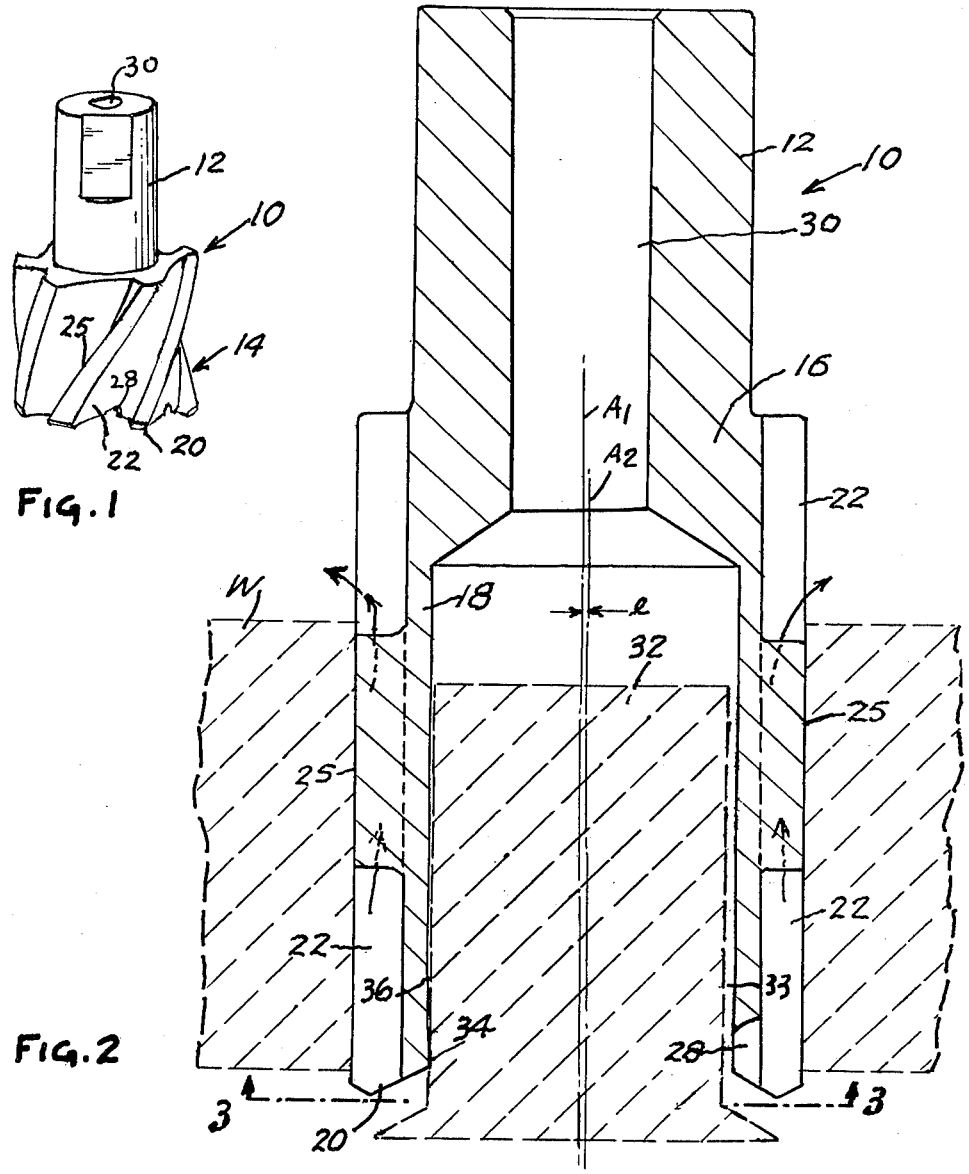
Fig. 1
Fig. 2
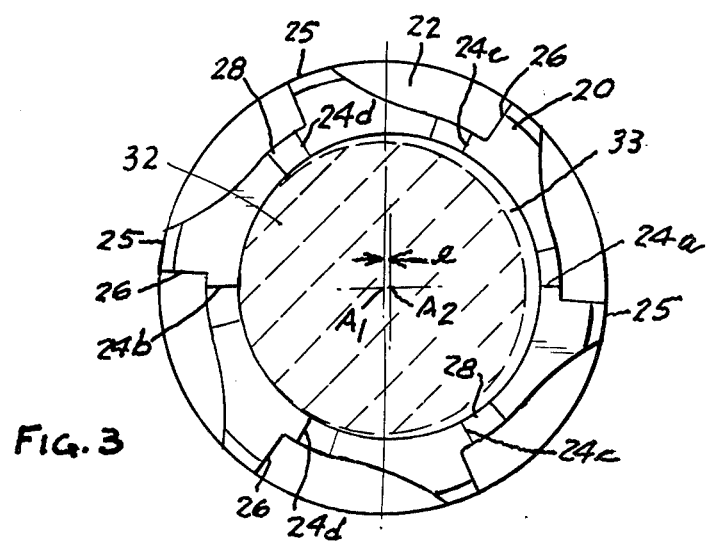
Fig. 3

ANNULAR HOLE CUTTER

This invention relates to an annular hole cutter.

When cutting a hole with an annular cutter the teeth cut a circular groove in the workpiece which forms a central cylindrical slug within the cutter. In order to prevent binding of the slug within the cutter and to provide a coolant passageway within the cutter which extends down to the cutter teeth, cutters are frequently designed to provide clearance space between the inner periphery of the cutter side wall and the outer periphery of the central slug. With cutters in the form of a thin circular saw blade this clearance can be obtained in the manner shown in my prior U.S. Pat. No. 3,559,513 where selected teeth around less than one-half the circumference of the cutter are bent inwardly slightly. However, cutters used for cutting holes in thick metal workpieces, as distinguished from sheet metal, are not in the form of a saw blade bent into circular shape, but are machined from bar stock and have a relatively thick side wall with cutters of the latter type, clearance between the inner periphery of the cutter side wall and the central slug is normally obtained by grinding an axial taper on the inner periphery of the cutter side wall. Normally this taper is about 0.008 inches for the length of the side wall.

The strength of an annular cutter is normally primarily determined by the thickness of its fluted side wall. However, the efficiency of the cutting action normally decreases as the side wall thickness increases since the width of the groove cut varies in accordance with the side wall thickness. Where a machined annular cutter is provided with an axial taper on its innner periphery its strength is determined by the thinnest section of the side wall. Therefore, in an internally tapered cutter, if the cutter side wall has a predetermined thickness at the cutting teeth, the thickness of the side wall becomes progressively less towards the shank end of the cutter. It follows that for a cutter designed to cut through relatively thick stock it is impractical to provide the necessary clearance between the cutter and the slug by grinding an internal taper on the cutter.

However, even with internally tapered cutters, the problem of binding of the slug within the cutter is not entirely eliminated. This results from the fact that, as the cutter advances into the work, the cutter slug becomes heated and expands. Therefore, at the end of a cutting operation the diameter of the slug is normally slightly larger than the inner diameter of the side wall at the tooth end thereof. This results in binding of the slug within the cutter and frequently also results in tooth breakage.

The primary object of the present invention is to provide a machined annular cutter which produces the desired clearance between the cutter side wall and the central slug throughout their entire length without substantially reducing the side wall thickness of the cutter.

A more specific object of this invention resides in the provision of a machined annular cutter wherein the desired clearance between the cutter and the central slug is obtained by forming the cutter so that the outer periphery of the side wall is concentric with the central axis about which the cutter rotates and the inner periphery of the side wall is eccentric with respect to said axis. Since the outer periphery of the cutter is concentric with the central axis of the cutter, a smooth accurate hole is cut. However, since the inner periphery is eccentric with respect to the axis about which the cutter is rotated, the diameter of the central slug is smaller than the inner diameter of the cutter side wall by an amount equal to twice the aforesaid eccentricity.

Other objects, features and advantages of the present invention will become apparent from the following description and accompanying drawing, in which:

FIG. 1 is a perspective view of an annular cutter of the type to which the present invention relates;

FIG. 2 is a sectional view of a cutter embodying the present invention and showing the cutter as it penetrates through a workpiece; and FIG. 3 is a sectional view of the cutter taken along the line 3—3 in FIG. 2.

Referring to FIG. 1, the cutter, generally designated 10, includes a shank 12 and a cutter body 14. The cutter body 14 is of inverted cup shape so that, as illustrated in FIG. 2, it is defined by a top wall 16 and an annular side wall 18. The lower end of the side wall 18 has a plurality of circumferentially spaced cutting teeth 20 thereon. The outer periphery of side wall 18 is formed with a plurality of helical flutes 22 which extend upwardly from the teeth 20. Flutes 22 are separated by circular lands 25. In the cutter illustrated the configuration of each tooth 20 is substantially the same as shown in my prior U.S. Pat. No. Re. 23,416. More specifically, each tooth 20 is provided with a radially inner cutting edge 24 and a radially outer cutting edge 26. The inner cutting edge 24 of each tooth is staggered forwardly in the direction of rotation of the cutter relative to the outer cutting edge 26. Cutting edge 24 defines the lower end of an inner gullet 28 for directing chips cut by the inner cutting edge 24 outwardly into flute 22.

The outer periphery of shank 12 is ground so that it is concentric to the central axis $A_1$ of the cutter to a high degree of accuracy. Preferably, shank 12 is formed with a central through bore 30 by means of which coolant supplied to the arbor in which the shank is retained can be directed downwardly within the cutter to the teeth 20.

Referring now to FIG. 3 where the most important feature of the present cutter is illustrated, the outer periphery of the cutter side wall defined by the lands 25 is ground concentric to the axis $A_1$ to a high degree of accuracy, preferably to a tolerance of ±0.002 inches. The inner periphery of the cutter side wall 18 is ground concentric to the axis $A_2$ to a high degree of accuracy, that is, within the same tolerance as the outer periphery of the cutter. However, the axis $A_2$ is offset radially slightly from the axis $A_1$. Tests have shown that the cutter performs very well when the axis $A_2$ is offset from the axis $A_1$ within a range of 0.004 to 0.006 inches. In the drawing this radial offset of axis $A_2$ from axis $A_1$ is designated e. Tests have shown that with respect to surface finish, out-of-roundness and the dimensional accuracy of the hole cut, bests results are obtained in metal when dimension e is about 0.005 inches. When dimension e begins to exceed about 0.006 inches, the surface finish of the hole deteriorates rapidly and the hole cut becomes progressively oversized in relation to the outer diameter of the cutter.

In FIGS. 2 and 3 the axis $A_2$ is shown shifted to the right relative to the axis $A_1$. The flutes 22 are all ground to the same depth and, consequently, the inner edge 24a at the right side of FIG. 3 is narrower than the edge 24b at the left of FIG. 3 by an amount equal to twice the dimension e. The two cutting edges designated 24c are slightly wider than the cutting edge 24a and the two cutting edges designated 24d are slightly narrower than the cutting edge 24b. It therefore follows that with respect to the central slug 32 formed as the cutter penetrates through the workpiece, the outer surface thereof is generated solely by the edge 24b which is the radially innermost cutting edge. The inner ends of the remaining cutting edges are all spaced radially outwardly from the outer surface of slug 32 as shown in FIG. 3. The arcuate clearance space 33 which results from the offsetting of axis $A_2$ from the axis $A_1$ provides an excellent axial passage from the bore 30 in shank 12 downwardly to the cutting teeth of the cutter. In addition, as soon as the teeth penetrate through the under surface of the workpiece W, the center slug 32 drops freely from within the cutter since its outer diameter is smaller than the inner diameter of wall 18 by an amount equal to twice the dimension e.

With the cutter thus far described the inner surface of the cutter wall 18 would contact slug 32 theoretically only along a line in axial alignment with the radially inner end of the cutting edge 24b. In order to reduce frictional contact between the cutter and the slug 32 to an absolute minimum, it has been found desirable to grind the inner surface of wall 18 with a slight taper. However, this taper is relatively short in comparison to the length of wall 18. For example, the taper, which is designated 34 in FIG. 2, terminates at the section designated 36 and has an axial extent of only about one-quarter to one-half inch. The extent of this taper is such that at the section 36 the diameter of the inner periphery of wall 18 is about 0.004 to 0.006 inches greater than at the lower end of the cutter. In other words, the total taper is on the order of about 0.002 to 0.003 inches.

I claim:

1. An annular hole cutter having a shank adapted to be engaged with a holder for rotation about the central axis of the shank, said shank having an inverted cup-shaped body portion fixedly supported at the lower end thereof, said body portion having a top wall and an annular side wall provided with a plurality of circularly arranged cutting teeth spaced circumferentially around the lower end thereof, the outer periphery of the side wall having helical flutes therein extending upwardly from the teeth and separated by helical lands therebetween, the outer periphery of said shank and the circle defined by the outer periphery of said teeth being concentric to said axis to a high degree of accuracy and the circle defined by the inner periphery of said teeth being concentric to a high degree of accuracy to an axis parallel to and offset slightly radially a predetermined distance from said central axis.

2. An annular hole cutter as called for in claim 1 wherein said high degree of accuracy is within a predetermined manufacturing dimensional tolerance and said offset if dimensionally greater than said tolerance.

3. An annular hole cutter as called for in claim 2 wherein said offset is about 0.004 to 0.006 inches.

4. An annular hole cutter as called for in claim 2 wherein said offset is about 0.005 inches.

5. An annular hole cutter as called for in claim 1 wherein said tooth circles coincide with the respective inner and outer peripheries of said side wall at the lower end thereof and the inner periphery of said side wall is tapered outwardly in an upward direction an amount less than said offset amount.

6. An annular hole cutter as called for in claim 5 wherein said offset amount is about 0.004 to 0.006 inches and the lower end of said side wall is about 0.002 to 0.003 inches thicker than the upper end thereof.

7. An annular hole cutter as called for in claim 1 wherein said tooth circles coincide with the respective inner and outer peripheries of said side wall at the lower end thereof and the inner periphery of said side wall is tapered outwardly in an upward direction for a distance of about one-quarter to one-half inch from the lower ends of said teeth, said inner periphery being cylindrical above said tapered portion, the radial extent of said taper being less than said offset amount.

8. An annular hole cutter as called for in claim 7 wherein said offset amount is about 0.004 to 0.006 inches and said taper is on the order of about 0.002 to 0.003 inches.

9. An annular hole cutter as called for in claim 1 wherein said shank has an axial passageway therethrough adapted for directing coolant between the outer peripheral surface of the slug cut by the teeth and the inner peripheral surface of said side wall.

10. An annular hole cutter as called for in claim 1 wherein all of said flutes have substantially the same radial depth.

11. An annular hole cutter having a shank adapted to be engaged with a holder for rotation about the central axis of the shank, said shank having an inverted cup-shaped body portion fixedly supported at the lower end thereof, said body portion having a top wall and an annular side wall provided with a plurality of circularly arranged cutting teeth spaced circumferentially around the lower end thereof, the outer periphery of said shank and the circle defined by the outer periphery of said teeth being concentric to said axis to a high degree of accuracy and the circle defined by the inner periphery of said teeth being concentric to a high degree of accuracy to an axis parallel to and offset slightly radially a predetermined distance from said central axis.

* * * * *